US008630367B2

(12) United States Patent
Hansen et al.

(10) Patent No.: US 8,630,367 B2
(45) Date of Patent: Jan. 14, 2014

(54) SIGNALING FORMAT FOR WIRELESS COMMUNICATIONS

(75) Inventors: Christopher J. Hansen, Sunnyvale, CA (US); Jason Alexander Trachewsky, Menlo Park, CA (US); Amit G. Bagchi, Mountain View, CA (US); George Kondylis, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 10 days.

(21) Appl. No.: 13/316,753

(22) Filed: Dec. 12, 2011

(65) Prior Publication Data

US 2012/0140758 A1 Jun. 7, 2012

Related U.S. Application Data

(63) Continuation of application No. 12/559,824, filed on Sep. 15, 2009, now Pat. No. 8,094,749, which is a continuation of application No. 11/056,155, filed on Feb. 14, 2005, now Pat. No. 7,590,189, which is a continuation-in-part of application No. 10/778,754, filed on Feb. 13, 2004, now Pat. No. 7,162,204, and a continuation-in-part of application No. 10/778,751, filed on Feb. 13, 2004, now Pat. No. 7,269,430, and a continuation-in-part of application No. 10/779,245, filed on Feb. 13, 2004, now Pat. No. 7,539,501.

(60) Provisional application No. 60/580,026, filed on Jun. 16, 2004, provisional application No. 60/546,622, filed on Feb. 20, 2004, provisional application No. 60/544,605, filed on Feb. 13, 2004.

(51) Int. Cl.
*H04L 27/00* (2006.01)

(52) U.S. Cl.
USPC .......................................... 375/295; 375/259

(58) Field of Classification Search
USPC .................. 375/259–260, 295; 370/464–466
See application file for complete search history.

(56) References Cited

U.S. PATENT DOCUMENTS

| | | | |
|---|---|---|---|
| 6,563,880 B1 | 5/2003 | Hunsinger et al. |
| 6,940,913 B2 | 9/2005 | Verbin et al. |
| 7,031,690 B2 | 4/2006 | Prodanov et al. |
| 7,054,296 B1 | 5/2006 | Sorrells et al. |
| 7,075,906 B2 | 7/2006 | Douglas et al. |
| 7,162,204 B2 | 1/2007 | Hansen et al. |
| 7,269,430 B2 | 9/2007 | Moorti et al. |

(Continued)

OTHER PUBLICATIONS

Jianhua Liu, Jian Li and Petre Stoica, A MIMO System With Backward Compatibility for OFDM Based WLANS, 2003 4th IEEE Workshop on Signal Processing Advances in Wireless Communications, 0-7803-7858-X/03, Jun. 2003, pp. 130-134.

(Continued)

*Primary Examiner* — Jean B Corriellus
(74) *Attorney, Agent, or Firm* — Garlick & Markison; Edward J. Marshall (57) ABSTRACT

Methods, devices and systems for wireless communication generate signals by determining whether legacy devices are within a proximal region of the wireless communication. When at least one legacy device is within the proximal region, a frame is formatted to include a preamble field, a signal field, and a data field. Further, the uncoded bits are encoded according to a coding format. The coding format is determined according to bits in the preamble and applicable sub-field lengths.

21 Claims, 6 Drawing Sheets

(56) References Cited

U.S. PATENT DOCUMENTS

| | | | |
|---|---|---|---|
| 7,274,652 B1 | 9/2007 | Webster et al. | |
| 7,277,432 B2 | 10/2007 | Liang et al. | |
| 7,415,074 B2 | 8/2008 | Seto et al. | |
| 7,519,128 B2 | 4/2009 | Seto et al. | |
| 7,539,266 B1* | 5/2009 | Hsu | 375/279 |
| 7,539,501 B2 | 5/2009 | Moorti et al. | |
| 7,590,189 B2 | 9/2009 | Hansen et al. | |
| 2003/0135797 A1* | 7/2003 | Choi | 714/704 |
| 2003/0147374 A1 | 8/2003 | Chiu et al. | |
| 2004/0234001 A1 | 11/2004 | Huynh et al. | |
| 2004/0266372 A1 | 12/2004 | McCallister | |
| 2005/0070231 A1 | 3/2005 | Jensen | |
| 2005/0111449 A1 | 5/2005 | Moorti et al. | |
| 2005/0113026 A1 | 5/2005 | Moorti et al. | |
| 2005/0113101 A1 | 5/2005 | Hansen et al. | |
| 2005/0135318 A1* | 6/2005 | Walton et al. | 370/338 |
| 2005/0180524 A1 | 8/2005 | Hansen et al. | |
| 2005/0232307 A1* | 10/2005 | Andersson et al. | 370/503 |
| 2005/0265303 A1* | 12/2005 | Edwards et al. | 370/349 |
| 2005/0276347 A1* | 12/2005 | Mujtaba et al. | 375/299 |
| 2005/0281241 A1* | 12/2005 | Webster et al. | 370/343 |
| 2006/0030267 A1 | 2/2006 | Bhardwaj et al. | |
| 2006/0274667 A1* | 12/2006 | Mir et al. | 370/252 |
| 2007/0116022 A1* | 5/2007 | Kwon et al. | 370/401 |
| 2010/0002672 A1 | 1/2010 | Hansen et al. | |

OTHER PUBLICATIONS

XP-002236904, Part 11: Wireless LAN Medium Access Control (MAC) and Physical Layer (PHY) specifications: High-speed Physical Layer in the 5 GHZ Band, Sponsor: LAN/MAN Standards Committee of the IEEE Computer Society, IEEE Std 802.11 a-1999, Sep. 1999, pp. 1-53.

Takeshi Onizawa, Masato Mizoguchi, Masahiro Morikura and Toshiaki Tanaka, A Fast Synchronization Scheme of OFDM Signals for High-Rate Wireless LAN, IEICE Trans. Commun., vol. E82-B. No. 2, Feb. 1999, pp. 455-463.

Erik G. Larsson and Jia Li, Preamble Design for Multiple-Antenna OFDM-Based WLANs With Null Subcarriers, IEEE Signal Processing Letters, vol. 8, No. 11, Nov. 2001, pp. 285-288.

XP-002298432, 802.11gTM, IEEE Standard for Information Technology. Part 11: Wireless LAN Medium Access Control (MAC) and Physical Layer (PHY) Specifications, Amendment 4: Further Data Rate Extension in the 2.4 GHz Band, IEEE Computer Society, Jun. 2003, pp. 1-78.

* cited by examiner

SIGNALING FORMAT FOR WIRELESS COMMUNICATIONS

CROSS REFERENCE TO RELATED APPLICATIONS

The present application is a CONTINUATION of U.S. application Ser. No. 12/559,824, which is a CONTINUATION of U.S. application Ser. No. 11/056,155, filed Feb. 14, 2005, now issued U.S. Pat. No. 7,590,189, which is a CONTINUATION-IN-PART of: U.S. application Ser. No. 10/778,754, filed Feb. 13, 2004, now issued U.S. Pat. No. 7,162,204; U.S. application Ser. No. 10/778,751, filed Feb. 13, 2004, now issued U.S. Pat. No. 7,269,430; and U.S. application Ser. No. 10/779,245, filed Feb. 13, 2004, now issued U.S. Pat. No. 7,539,501.

Said U.S. application Ser. No. 11/056,155 also claims benefit from and priority to the following U.S. provisional applications: U.S. Application No. 60/544,605, filed Feb. 13, 2004; U.S. Application No. 60/546,622 filed Feb. 20, 2004; and U.S. Application No. 60/580,026, filed Jun. 16, 2004.

BACKGROUND OF THE INVENTION

1. Field of the Invention

This invention relates generally to wireless communication systems and more particularly to supporting multiple wireless communication protocols within a wireless local area network by formatting, modulating, and coding a signal.

2. Description of the Related Art

Wireless and wire lined communications between wireless or wire lined communication devices use networks and systems to exchange information and data. Communication systems may include national or international cellular telephone systems to the Internet to point-to-point in-home wireless networks. Each type of communication system may operate in accordance with one or more communication protocol standards. For example, wireless communication systems may operate in accordance with one or more protocol standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and the like. The applicable protocol for wireless communications standard may vary. As the IEEE 802.11 specification has evolved from IEEE 802.11 to IEEE 802.11b (standard 11b) to IEEE 802.11a (standard 11a) and to IEEE 802.11g (standard 11g), wireless communication devices that are compliant with standard 11b may exist in the same wireless local area network (WLAN) as standard 11g compliant wireless communication devices.

When legacy devices such as those compliant with an earlier version of a standard reside in the same WLAN as devices compliant with later versions of the standard, mechanisms or processes may be employed for the legacy devices to know when the newer version devices are utilizing the wireless channel to avoid interference or a collision. A legacy system may be an existing system that is in place and available for use in wireless local area networks. The issue of legacy systems may be important because these systems may remain in place after new standards, methods or networks for future wire local area networks are implemented.

The different protocols or standards may operate within different frequency ranges, such as 5 to 6 gigahertz (GHz) or, alternatively, 2.4 GHZ. For example, standard 11a may operate within the higher frequency range. An aspect of standard 11a is that portions of the spectrum, between 5 to 6 GHz, are allocated to a channel for wireless communications. The channel may be 20 megahertz (MHz) wide within the frequency band. Standard 11a also may use orthogonal frequency division multiplexing (OFDM). OFDM may be implemented over subcarriers that represent lines, or values, within the frequency domain of the 20 MHz channels. A signal may be transmitted over different subcarriers within the channel. The subcarriers may be orthogonal to each other so that information or data is extracted off each subcarrier about the signal.

Backward compatibility with legacy devices may be enabled at the physical (PHY) layer or the Media-Specific Access Control (MAC) layer. At the PHY layer, backward compatibility is achieved by re-using the PHY preamble from a previous standard. Legacy devices may decode the preamble portion of all signals, which provides sufficient information for determining that the wireless channel is in use for a specific period of time, to avoid interference and collisions even though the legacy devices cannot fully demodulate or decode the transmitted frame(s).

At the MAC layer, backward compatibility with legacy devices may be enabled by forcing devices that are compliant with a newer version of the standard to transmit special frames using modes or data rates that are employed by legacy devices. These special frames may contain information that sets the network allocation vector (NAV) of legacy devices such that these devices know when the wireless channel is in use by newer stations.

As new standards or protocols are implemented, backward compatibility of receiving and transmitting signals may become more of a concern. New signaling formats may desire more robustness than legacy formats: Further, frames exchanged within a wireless system may include immediate acknowledgement capabilities, bursting information and exchanging more bits of information than frames used by legacy devices.

SUMMARY OF THE INVENTION

A method for coding a signal for wireless communication is disclosed. The method includes determining a coding format according to a signal field. The method also includes arranging at least one bit in the signal field to comply with a channel width. The method also includes generating a coded signal field according to the coding format and the at least one bit in the signal field.

A method for generating a signal field for wireless communication also is disclosed. The method also includes coding a signal field according to a coding format. The coding format uses a convolutional code having a rate. The method also includes adding a preamble to the signal field to support communication over a first channel and a second channel. The first channel is wider than the second channel. The method also includes modulating the signal field over a set of subcarriers pertaining to the first channel.

A method for generating a signal for wireless communication also is disclosed. The method includes generating a signal field having a rate/mode sub-field, a length sub-field, at least one data unit sub-field and a reserved sub-field. The method also includes determining a coding format according to the reserved sub-field. The method also includes arranging at least one bit in the sub-fields according to the coding format and a wireless communication standard for the signal field. The method also includes coding the signal field with the coding format.

DETAILED DESCRIPTION OF THE PREFERRED EMBODIMENTS

Reference is now made in detail to the preferred embodiments of the present invention, examples of which are illustrated by the accompanying drawings.

Figure 1:
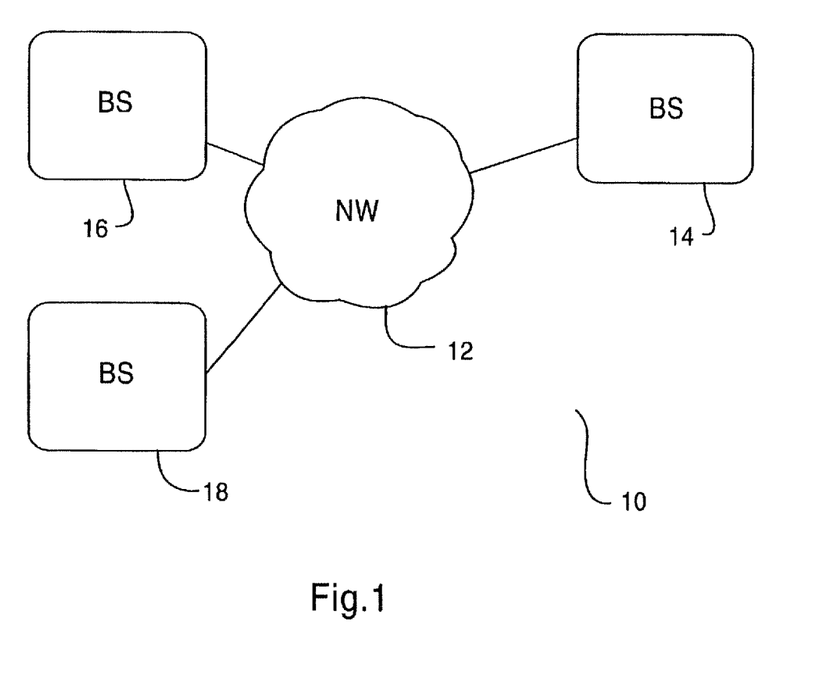
FIG. 1 illustrates a wireless communication system in accordance with the present invention.

FIG. 1 depicts a diagram of a wireless communication system 10 according to the present invention. Communication system 10 may include stations 14, 16 and 18. Stations 14, 16 and 18 may include wireless communication devices, such as cellular or wireless phones, digital devise, laptop or desktop computers, personal digital assistants, wireless modems, wireless gaming modules, and the like. Stations 14, 16, and 18 may be coupled to access point 12, which exchanges data, or information within communication system 10. Additional stations and applicable devices, or components, may be coupled to access point 12 within communication system 10.

Communication system 10 may forward data or information in the form of signals, either analog or digital. Wireless devices or components within the individual base stations may register with the base station to receive services or communications within communication system 10. Wireless devices may exchange data or information via an allocated channel within access point 12. Access point 12 may establish local area networks (LANs), wide area networks (WANs), wireless local area networks (WLAN), ad-hoc networks, and the like.

Communication system 10 may operate under various protocols or standards to support wireless communication. For example, communication system 10 may operate under the IEEE 802.11n (standard 11n) standard for wireless communications. Standard 11n may be considered a current standard or protocol, while the other standards, such as standard 11a, may be considered legacy standards. Alternatively, communication system 10 may operate under a variety of standards, such as standard 11a, standard 11g, and standard 11n. Communication system 10 also may include legacy devices or components that do not support current standards. For example, certain legacy devices or components may comply with standard 11a, while newer devices or components may comply with standard 11n.

Standard 11n may occupy the 5-6 GHz band, or, alternatively, standard 11 may occupy the 2.4 GHz band. Standard 11n may be considered an extension of standard 11a, with improvements. Standard 11n devices and components may operate throughput of 100 Mbps or more, at the MAC. The physical layer rate for standard 11n devices and components may be greater than those of legacy protocols or standards. Further, the bandwidth for channels under standard 11n may be 20 MHz, or 40 MHz. Thus, standard 11n may implement wider channels than previous standards.

Wireless communications using standard 11n may occur on different mediums or using different configurations. For example, multiple antennas may be used in communication system 10 via station 16. The multiple antennas may act as multiple transmitters and multiple receivers so that several signals may be exchanged. The number of transmitters or receivers may depend on the number of data streams. Thus, communication 10 may include, as discussed above, multiple input, a multiple output (MIMO) structure. MIMO structures, or configurations, may improve robustness of wireless communications in a communication system 10. To better improve robustness, communication system 10 may have the number of data streams to be less than the number of transmitters.

Communication system 10, under standard 11n, may desire high throughput wireless communication between, for example, a device in station 14 to a device in station 16. Access point 12, along with stations 14, 16 and 18 may form mixed networks, such as WANs, LANs, and the like, from standard 11a and standard 11n devices. These networks may include "Greenfield" heterogeneous networks of standard 11n devices that occupy 20 MHz and 40 MHz channels. A presumption may exist that stations 15, 16 and 18 can receive all signals, no matter which standard is in effect.

Figure 2:
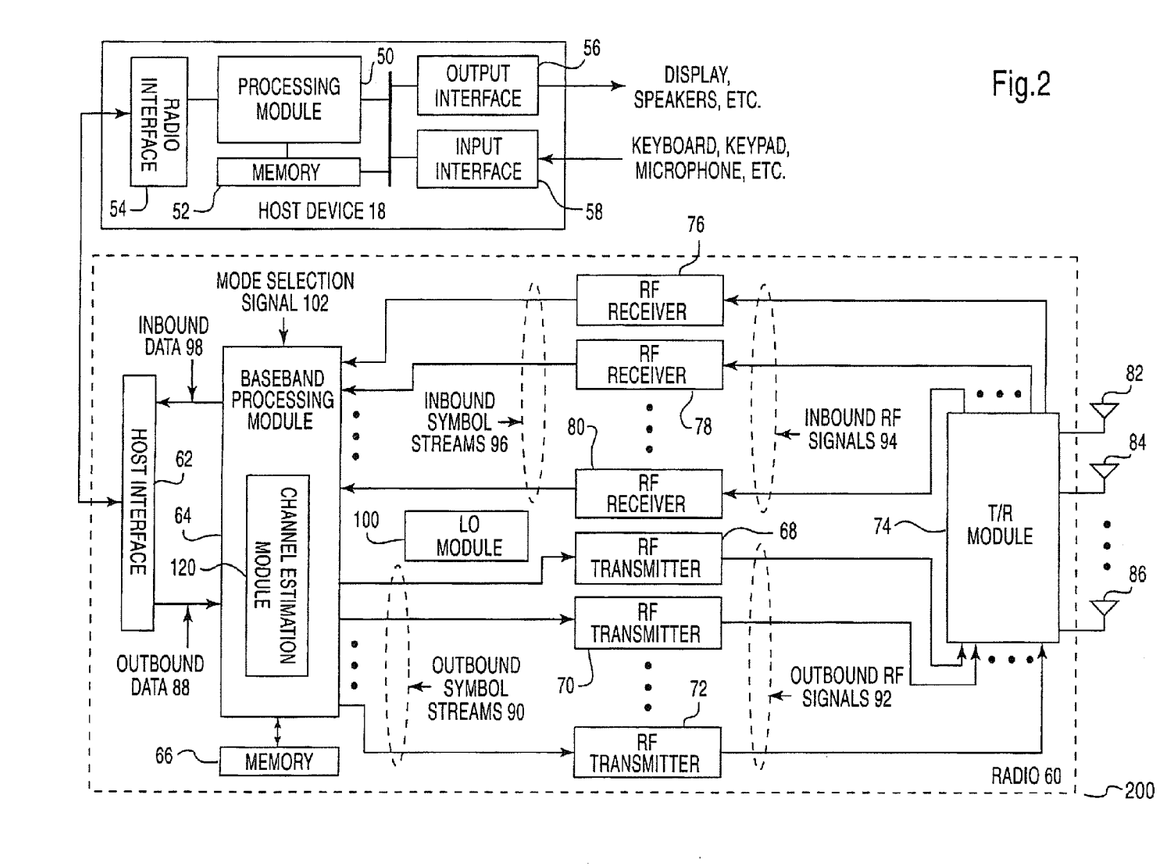
FIG. 2 illustrates a wireless communication device in accordance with the present invention.

FIG. 2 is a block diagram illustrating a wireless communication device 200 according to the present invention. Wireless device 200 may include host device 18 and an associated radio, or station, 60. For cellular telephone hosts, radio 60 may be a built-in component. For personal digital assistants hosts, laptop hosts, or personal computer hosts, radio 60 may be built-in or an externally coupled component. Radio 60 also may be compliant with one of a plurality of wireless local area network (WLAN) protocols including, but not limited to, standard 11n.

Host device 18 may include processing module 50, memory 52, radio interface 54, input interface 58 and output interface 56. Processing module 50 and memory 52 execute the corresponding instructions that may be executed by host device 18. For example, for a cellular telephone host device, processing module 50 may perform the corresponding communication functions in accordance with a particular cellular telephone standard.

Radio interface 54 allows data to be received from and sent to radio 60. For data received from radio 60, or inbound data, radio interface 54 may provide the data to processing module 50 for further processing or routing to output interface 56. Output interface 56 provides connectivity to an output display device such as a display, monitor, speakers and the like, such that the received data may be displayed. Radio interface 54 also provides data from processing module 50 to radio 60. Processing module 50 may receive the outbound data from an input device such as a keyboard, keypad, microphone and the like, via input interface 58 or generate the data itself. For data received via input interface 58, processing module 50 may perform a corresponding host function on the data or route it to radio 60 via radio interface 54.

Radio, or station, 60 may include a host interface 62, a baseband processing module 64, a memory 66, a plurality of radio frequency (RF) transmitters 68-72, a transmit/receive (T/R) module 74, a plurality of antennas 82-86, a plurality of RF receivers 76-80, and a local oscillation module 100. Baseband processing module 64, in combination with operational instructions stored in memory 66, may execute digital receiver functions and digital transmitter functions, respectively.

Baseband processing modules 64 may be implemented using one or more processing devices. Such a processing device may be a microprocessor, micro-controller, digital signal processor, microcomputer, central processing unit and the like. Memory 66 may be a single memory device or a plurality of memory devices. When processing module 64 implements one or more of its functions via a state machine, analog circuitry, digital circuitry, or logic circuitry, the memory storing the corresponding operational instructions is embedded with the circuitry comprising the state machine, analog circuitry, digital circuitry, or logic circuitry.

In operation, radio 60 may receive outbound data 88 from host device 18 via host interface 62. Baseband processing module 64 receives outbound data 88 and, based on a mode selection signal 102, produces one or more outbound symbol streams 90. Mode selection signal 102 may indicate a particular mode. For example, mode selection signal 102 may indicate a frequency band of about 2.4 GHz, a channel bandwidth of 20 or 22 MHz, and a maximum bit rate of about 54 megabits-per-second. Mode selection signal 104 may indicate a particular rate ranging from 1 megabit-per-second to 54 megabits-per-second. In addition, mode selection signal 102 may indicate a particular type of modulation, which includes, but is not limited to, Barker Code Modulation, BPSK, QPSK, CCK, 16 QAM or 64 QAM.

Baseband processing module 64, based on mode selection signal 102 produces one or more outbound symbol streams 90 from output data 88. For example, if a mode selection signal 102 indicates that a single transmit antenna is being utilized for a particular mode that has been selected, baseband processing module 64 may produce a single outbound symbol stream 90 for wireless device 200. Alternatively, if mode select signal 102 indicates 2, 3 or 4 (multiple) antennas, baseband processing module 64 may produce 2, 3 or 4 (multiple) outbound symbol streams 90 corresponding to the number of antennas of wireless device 200.

Depending on the number of outbound streams 90 produced by baseband module 64, a corresponding number of the RF transmitters 68-72 may be enabled to convert outbound symbol streams 90 into outbound RF signals 92. Transmit/receive (T/R) module 74 may receive outbound RF signals 92 and may provide each outbound RF signal to a corresponding antenna 82-86.

When radio 60 is in a receive mode, T/R module may 74 receive inbound RF signals 94 via antennas 82-86. T/R module 74 provide inbound RF signals 94 to RF receivers 76-80. RF receivers 76-80 may convert inbound RF signals 94 into a corresponding number of inbound symbol streams 96. The number of inbound symbol streams 96 may correspond to the particular mode in which the data was received. Baseband processing module 60 receives inbound symbol streams 90 and converts them into inbound data 98, which is provided to host device 18 via host interface 62.

Thus, wireless device 200 may generate and exchange signals within a wireless communication system 10, as shown in FIG. 1. Some features and functions of wireless device 200 may be found in current and legacy devices in a wireless communication system. Wireless device 200 also may react differently to signals supported by different standards or protocols.

In communication system 10 of FIG. 1, the communication device may be a newer device as described with reference to FIGS. 2, or may be a legacy device, compliant with an earlier version or predecessor of standard 11n. The newer devices may configure the channel bandwidth in a variety of ways.

Figure 3:
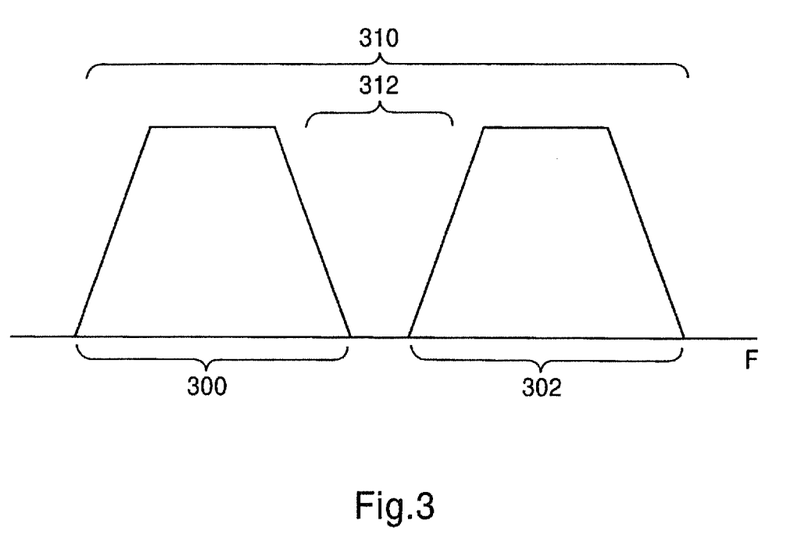
FIG. 3 illustrates a diagram of a wide bandwidth channel in accordance with the present invention.

FIG. 3 depicts a diagram of a wide bandwidth channel 310 including channels 300 and 302 according to the present invention.

Wide bandwidth channel 310 may be a 40 MHz channel capable of supporting signals according to MIMO protocols, such as standard 11n. Channels 300 and 302 may be smaller than wide bandwidth channel 310. For example, channels 300 and 302 may be 20 MHz channels and compatible with legacy standards, such as standard 11a, that may not support MIMO communications.

Guard band 312 also may be included in a wide bandwidth channel 310. During activation of wide bandwidth channel 310, guard band 312 may be filled with signal data or information. When channels 300 and 302 are activated, guard band 312 may not be filled. Thus, guard band 312 may be a gap between two legacy channels, such as channels 300 and 302. Further, wide bandwidth channel 319 includes a wider band than two legacy channels put together. Devices and components may desire to know whether a signal is formatted under standard 11n to use a wide bandwidth channel 310 or, for example, standard 11a to use channels 300 and 302. Failure to properly do so may result in interference or collision of signals. For example, if a signal formatted under standard 11n is placed in channels 300 and 302, then information or data may be lost because guard band 312 is not accounted for.

To construct wide bandwidth signal 310 without regard as to whether legacy devices are present, the overlapping legacy portions of channels 300 and 302 are considered when establishing the format for wide bandwidth channel 310. The preamble of wide bandwidth signal 310 may include a legacy header portion or a preamble in accordance with an earlier version or predecessor of standard 11n within the header spectral portion of channel 300, or channel 302. Legacy devices may be able to recognize the frame within wide bandwidth signal 310 and, based on the information contained within the preamble, refrain from transmission until wide bandwidth signal 310 has been transmitted.

For communication devices capable of receiving a wide bandwidth signal, the frames of the signals may include data or header information within guard band 312 of legacy channels, as discussed above. This feature may expand the amount of data that may be transmitted within a frame.

The preamble and packet header of a wide bandwidth signal using wide bandwidth channel 310 may use the same spectrum that the payload of a wide bandwidth signal uses to provide a legitimate preamble and packet headers that can be transmitted in the portion of the spectrum used by legacy devices. Further, energy of the signal may be transmitted in the legacy guard bands so that a receiver may perform reliable preamble processing, such as carrier detection, gain control, channel estimation and the like, on the wide-bandwidth signal.

The multiple-channel legacy preambles and packet headers may allow legacy station reception of the preamble and reliable carrier detection, gain control, and channel estimation over the legacy channels. The guard-band transmission may allow for reliable carrier detection, gain control, and channel estimation for the remainder of the spectrum that may be used for transmission of the wide bandwidth payload. Further, legacy stations may be tolerant of adjacent channel transmissions that are at the same power as the desired signal. Further, legacy stations may identify legitimate preambles and packet headers so that the stations are able to detect that a signal is present, perform gain control, channel estimation, and other preamble processing, or decode the packet header to defer transmission until the end of the wide-band transmission. Energy transmitted in guard band 312 may be disregarded by the receiver and may not hinder the reception of the legacy components of a wide-band signal.

For the newer devices that are standard 11n compliant, the devices may provide more energy for carrier detection, may perform a better estimate of received power, may do better to gain control on a packet, may estimate the channel response in a guard band 312 for use during payload demodulation, and May have full access to the medium because legacy stations see the transmission and defer until its end.

For example, channel 300 may operate within the region of 5230 and 5250 MHz. As shown in FIG. 3, the edges of the 20 MHz channel may taper off. Thus, a gap may arise at the edges of the channel. Referring to channel 302, it may operate within the region of 5750 and 5270 MHz, and have gaps similar to channel 300. Standard 11n networks may fill these gaps in order to increase the number of bits transmitted per time period. Thus, standard 11n-based devices and networks may process more than twice as much information or data as a single channel-based system.

Long training for a wide bandwidth signal with wide bandwidth channel 310 may correspond to long training associated with standard 11a. Standard 11n may use long training in the preamble of a frame or packet for channel timing sequence, channel sounding, channel estimation and the probability of reception. The preamble portion of a packet for standard 11n may be important for implementing the applicable standard and making sure the proper transmission or reception of the signals within a system is performed. Further, the preamble may have legacy compatibility such that the packet does not have interface errors or problems with legacy systems as discussed above. The preamble to a signal or the signal itself should be useful for new stations according to the new standards, but not incompatible with old stations.

Standard 11n may allow wireless communications to be more robust because of increased rates, modes, number of antennas, and the like. For example, standard 11n may use 6 bits to convey rate information and other data. The information may include the number of antennas and modes. A receiver, however, may need to know when it has received in the last frame and other data bursts according to standard 11n. All frames also may have immediate acknowledgement of frame reception in standard 11n. Acknowledgements may occur at the end of a frame. Because a signal in standard 11n may transmit more bits of information to increase performance, there may be more combinations of the numbers of antennas. This aspect may be important because of the MIMO structure supported by standard 11n. Standard 11n may be more robust than legacy systems, such as those implemented under standard 11a. Extra modes may exist, while the length of a frame, or its preamble, may be the same. As in standard 11a, standard 11n may use 6 bits but allow 64 modes. These modes may include modulation, encoding, encoding rate, types of encoding and the number of antennas. Bits may convey this information broken up into any proportion of the bits added to the signal.

Figure 4:
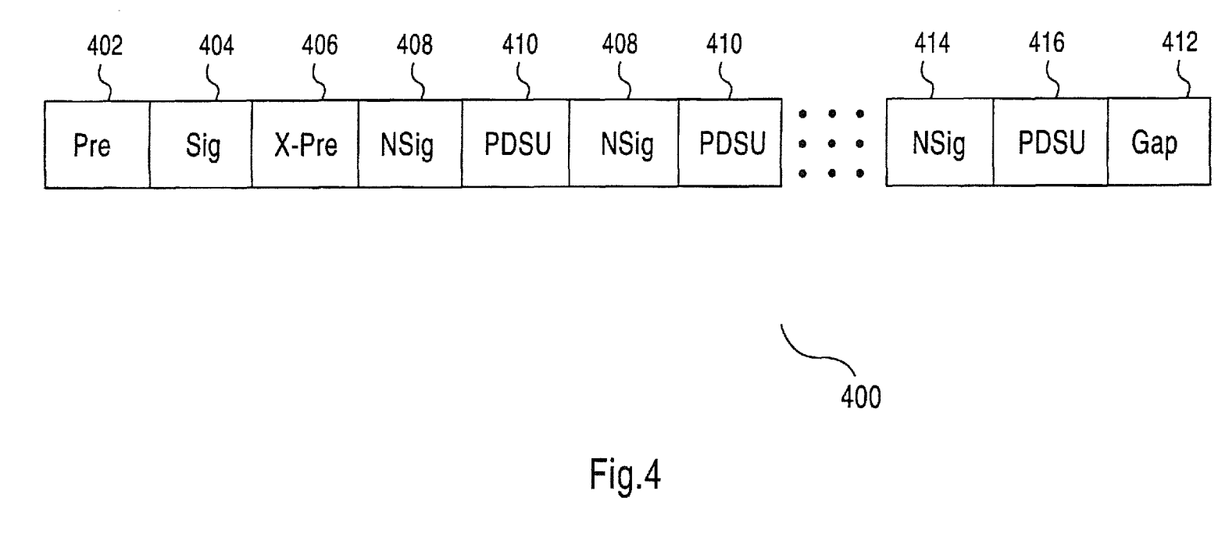
FIG. 4 illustrates a format of a signal in accordance with the present invention.

FIG. 4 depicts a format of a backward compatible signal 400 and its fields according to the present invention. Signal 400 also may be referred to as a frame. Signal 400 may be supportable by current and legacy devices within a wireless communication system, such as communication system 10 shown in FIG. 1. Signal 400 may be generated for transmission within a wireless device or component, such as wireless device 200 shown in FIG. 2. With regard to legacy devices, signal 400 may convey information or data on payload rate/mode, payload length in bytes, and error check capability. With regard to current, or MIMO devices, signal 400 may convey information or data on PNY-related MAC enhancements, such as data unit bursting, and a more robust error check capability. A more robust error check capability may reduce the likelihood of false signal field acceptance as legacy error check capability may be weak.

Signal 400 may include a legacy preamble 402, a signal field 404, an extended preamble 406, a plurality of additional signal fields 400, a plurality of data units (Service/PSDU) 410, and an interframe gap 412. Signal field 414 and PSDU 410 may be the last fields within signal 400 of their respective pluralities. Initial signal field 404 may inform the legacy devices of the duration of the frame so that the legacy devices do not attempt to access a channel while in use by newer devices. Signal field 404 also may inform the devices of the channel usage for standard 11n transmission and the number of applicable transmit antennas.

Additional signal fields 408 and 414 of signal 400 may allow the signal format to be more robust. A signal for use according to standard 11n may be more robust than signals in legacy systems. Thus, additional signal fields 408 and 414 may correlate to the rate, mode, number of antennas and a checksum. Signal 400 may use about 6 bits to convey the information or data. The number of bits used by signal 400, however, may vary as desired, such as 5 bits or 7 bits.

Signal 400 also may be subject to bursting. During a burst, the MAC may send frames in signal 400 without interframe spacing, so that the frames are placed together. The burst length may be conveyed at the end of the burst, with a bit being denoted as a "Last PDSU." Alternatively, another applicable identifier may be used to acknowledge the last frame.

Signal 400 may be implemented for high throughput communications, such as a standard 11n network or system, or a mixed network of legacy and standard 11n devices. These networks may include "Greenfield" networks having standard 11n devices that occupy 20 MHz and 40 MHz channels. Signal 400 may be compatible with both channels, as discussed above. Signal 400 also may be compatible with "Brownfield" networks having current and legacy devices.

Figure 5:
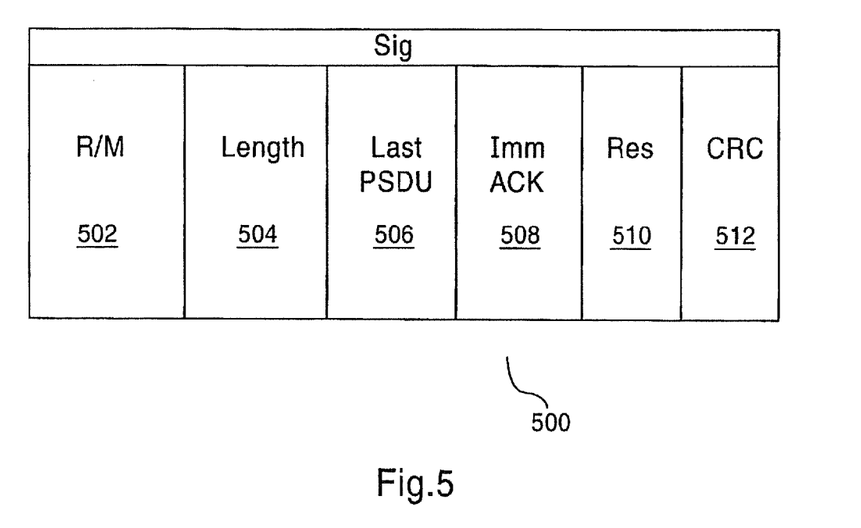
FIG. 5 illustrates a signal field having sub-fields in accordance with the present invention.

FIG. 5 depicts a signal field 500 having sub-fields according to the present invention. Signal field 500 may be incorporated into a signal or frame for transmission in a wireless network or system. Signal field 500 may be used in legacy devices or components, or in mixed networks having current and legacy devices or components. Signal field 500 may inform legacy devices or components of the use of standard 11n signals to limit medium contention between 20 MHz and 40 MHz channels. Signal field 500 also may inform standard 11n devices or components of the number of transmit antennas employed to indicate whether additional training sequences may follow for standard 11n usage. Signal field 500 also may provide information or data on rate/mode, length, the last PSDU in a burst, immediate acknowledgement requirement and an error check capability.

Thus, signal field 500 may indicate rate/mode sub-field 502, length of the frame sub-field 504, last PSDU in the frame sub-field 506, and a PSDU immediate acknowledgement (ACK) sub-field 508. Rate/mode sub-field 502 may be about 6 bits in length to convey the number of transmit antennas. A legacy signal field may be absent in a homogeneous standard 11n case. Rate/mode sub-field 502 also may convey channel width, such that standard 11n signal field transmitted by either 20 MHz or 40 MHz channel devices should be receivable by either 20 MHz or 40 MHz channel devices. PHY data rates may span 6 mbps through 448 mbps, with roughly 33% throughput increase with each higher data rate. Sixteen rates may be required, or 4 bits, in rule/mode sub-field 502 to allow 4 modes for achieving any given rate by varying channel width, subcarrier constellation size, number of transmit antennas and the like, or 2 bits of information or data.

Length portion sub-field 504 of signal field 500 may be about 12 bits to allow PSDUs up to 4095 bytes long as allowed in a legacy case. MAC level extension for PSDU bursting may not be represented in length as a Burst ID or Burst Length because burst length may be unknown at start of burst or, even if burst length is known, may be conveyed once at start or end of burst. Thus, no need may arise to index PSDUs in a burst at the PHY level because MAC methods may exist for unique PSDU identification.

Last PSDU sub-field 506 of signal field 500 may be about 1 bit to convey burst length at the end of a burst, with the bit denoting "Last PSDU." Immediate ACK sub-field 508 of signal field 500 may be about 1 bit to resolve contention between responding devices when a series of Immediate MAC acknowledgements are required to the series of PSDUs in a transmitted burst.

Signal field 500 also may include reserved sub-field 510 and CRC sub-field 512. Reserved sub-field 510 may be about 2-6 bits long depending on a chosen coding option. Reserved bits within reserved sub-field 510 may be reallocated to other fields within signal field 500, such as rate/mode field 502 or length field 500, such as rate/mode field 502 or length field 504, as necessary. CRC sub-field 512 may be about 4 bits and may provide error detection that is improved over a single parity bit in a legacy signal field. These bits also may be referred to as the checksum for signal field 500.

Immediate ACK sub-field 508 may provide immediate acknowledgement regarding signal field 500. Immediate acknowledgement of signal field 500 may be appropriate when bursting occurs so that frames are sent from the MAC without interframe spacing. The MAC may require that the frames have an acknowledgement policy, and frames may incorporate different policies. The acknowledgement may serve to let transceivers know when it is receiving the last frame in the burst. The acknowledgement is known as "immediate" because the MAC receives acknowledgement from the frame having signal field 500 without waiting for acknowledgements from other frames. Thus, once frames are received, they are acknowledged as soon as possible. Immediate ACK sub-field 508 may be about 1 bit long.

Thus, signal field 500 may have a length of about 26-30 information bits, but may remain at least as robust in performance and offer superior error detection capacity when compared to legacy standards or protocols. Performance may indicate the signal-to-noise ratio (SNR) desired to achieve a given probability of signal field error. Moreover, signal field 500 and the applicable sub-fields may be subject to coding and modulation with the signal, but may not lose or reduce its robustness.

Figure 6:
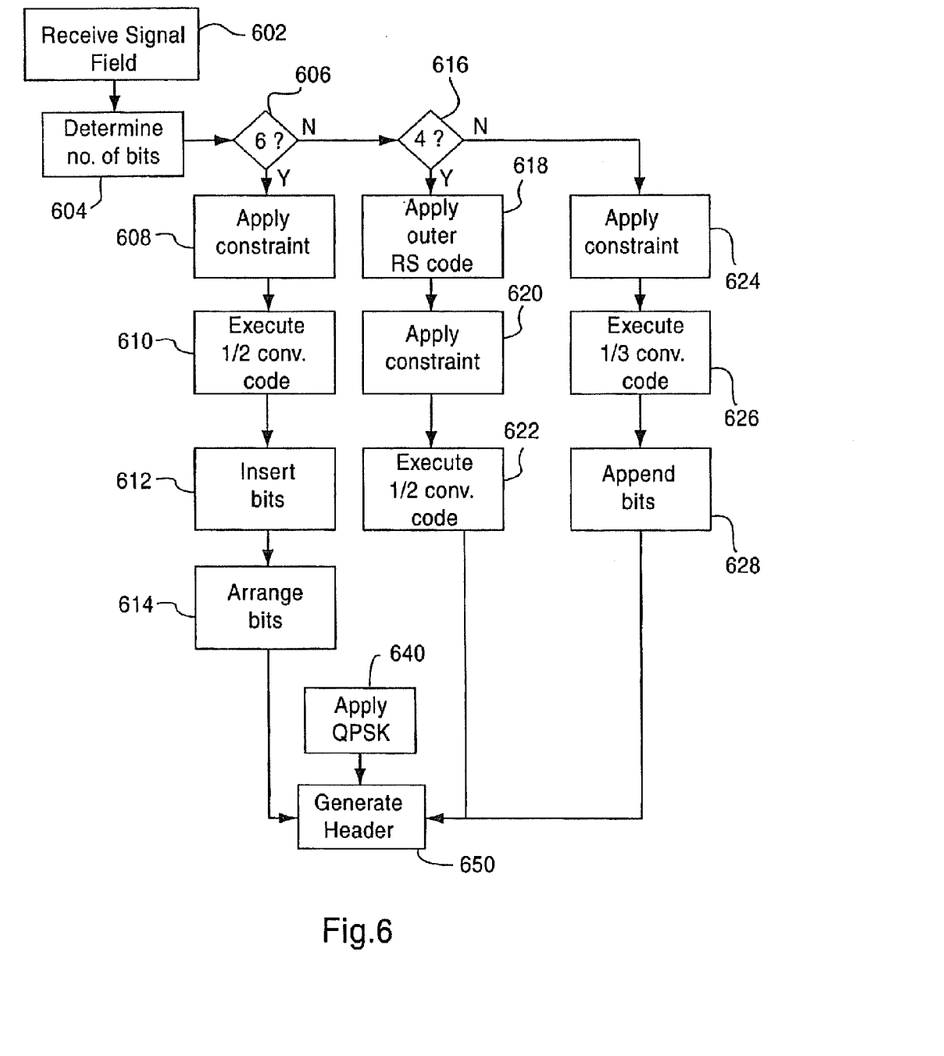
FIG. 6 illustrates a flowchart for coding and modulating a signal in accordance with the present invention.

FIG. 6 depicts a flowchart for coding and modulating a signal field according to the present invention. Proper coding and modulating the signal field may be determined by the applicable standard or protocol. A signal field used under standard 11n may allow 26-30 information bits, as discussed above. Legacy coding and modulation may allow 24 uncoded bits per signal field, with 18 information bits available and the remaining 6 bits acting as tail bit for immediate decoding. Thus, coding and modulation of the signal fields may account for these differences.

Step 602 executes by receiving a signal field that is to be transmitted in a frame of a signal in a wireless communication system. The signal field may be a specified length of about 26-30 bits. Alternatively, the received signal field may be of a different length, as appropriate. Step 604 executes by determining the number of reserved information bits in the signal field. Coding of the received signal field may occur according to three different options. The applicable option may depend upon the number of bits that are reserved in the signal field.

Step 606 executes by determining whether six reserved information bits are in the signal field. If yes, step 608 executes by applying a legacy constraint length. The legacy constraint length may be about 6 bits. Step 610 executes by executing a ½ convolutional code over the signal. For example, for signal field length of 96 coded bits, step 610 may convolutionally code 48 bits. A coded signal configuration may be desirable because it can out-perform an uncoded signal configuration. The code also may return to a known state in order to be effectively executed. Step 612 executes by inserting bits in the transmitted sequence. For example, 18 tail bits may be inserted in to the signal field. These 18 tail bits may include 12 tail bits in addition to 6 legacy tail bits. Step 614 executes by arranging the uncoded bits and tail bits. For example, the bits may be arranged as follows: 10 information, 6 tail, 10 information, 6 tail, 10 information and 6 tail. The sum of the arranged bits may be 30 information bits that is added to 18 tail bits to generate 48 uncoded bits, or, subsequently, 96 coded bits per signal field.

If step 606 determines that there is not 6 reserved information bits, then step 616 executes by determining whether 4 reserved information bits are in the signal field. If yes, step 618 is executed by applying an outer Reed-Solomon block code. The outer Reed-Solomon block code may be known as a (7,5) RS block code. Step 618 may include using two code words when applying the outer Reed-Solomon code. The code words may be about 21 bits in length. The code words are generated by grouping 15 information bits into 5 elements, and 6 parity bits into 2 elements. The parity bits may be added by Reed-Solomon encoding. The encoding results in 21 block coded bits, or 1 Reed-Solomon code word. Two Reed-Solomon code words may be used to get 42 bits. Step 620 executes by applying the legacy constraint length. The legacy constraint length may be about 6 tail bits. This constraint may result in 48 bits when the tail bits and the 2 Reed-Solomon code words are added together. Step 622 executes by executing the ½ convolutional code to the tail bits in the code words. The result may be 96 coded bits. Further, 6 tail bits may be appended to the coded bits so that 12 parity bits may exist with 6 bit errors that can be corrected. Thus, 30 information bits may exist along with 18 tail bits.

If step 616 is no, then step 624 is executed by applying the legacy constraint length to the signal field. The legacy constraint length may be about 6 bits. Step 626 executes by executing a ⅓ convolutional code over the signal field. Thus, step 626 may encode over the whole signal field. Step 628 executes by appending bits within the signal field. Six tail bits may be appended. A resulting signal field may be 26 information bits and 6 tail bits to equal 32 uncoded bits, or 96 coded bits for signal field.

Step 640 may execute by applying quadrature phase shift key modulation in 48 data bearing sub-carriers that allows 96 coded bits for a signal field. The 96 coded bits that result from the above 3 options may be modulated with QPSK over 48 tones. These tones may correspond to the sub-carriers. Sub-carriers supported by standard 11n are activated according to this modulation. For 40 MHz channel usage, 48 sub-carriers may be replicated in upper and lower 20 MHz halves to allow standard 11n signal field demodulation by legacy, or 20 MHz, channel devices. Step 650 executes by generating the appropriate header for the signal field such that the signal field may be transmitted and received within a wireless communication system with an increased probability of correct reception and in a more robust manner.

As discussed above, three options may be used in coding a signal field. The above options are distinguished according to the number of reserved bits. The options also may be distinguished or applied according to different criteria and their application is not dependent upon the number of reserved bits. For example, one option may be chosen to code all signal fields received in a device or component according to the present invention. Alternatively, two out of the three options may be employed and distinguished from each other according to different criteria, such as memory constraints or complexity of the convolutional code.

Packets having the signal field as discussed above may include headers greater than an 18 bit header found in legacy packets. Despite being larger, a generated header may be as robust as possible while transmitting more information bits than legacy signal fields.

The preceding discussion has presented various embodiments for wireless communications in a network that includes legacy devices. As one of average skill in the art will appreciate, other embodiments may be derived from the teachings of the present invention without deviating from the scope of the claims.

What is claimed is:

1. A method for use in a wireless communication device including a radio having a transmit module, the method comprising:
   receiving a signal field to be transmitted in a frame of a communication network, the communication network including both legacy and non-legacy wireless communication devices;
   configuring the frame to include a legacy preamble;
   configuring the signal field to include data informing the legacy wireless communication device of a frame duration;
   using the transmit module to transmit, in a legacy channel, a portion of the frame that includes the signal field;
      determining a coding format according to the signal field to be transmitted;
      arranging at least one bit in the signal field to comply with a channel width; and
   generating, using a baseband processing module, a coded signal field according to said coding format and said at least one bit in said signal field.

2. The method of claim 1, further comprising:
   inserting a legacy packet header into the frame; and
   transmitting, using the transmit module, the legacy packet header within a header spectral portion of the legacy channel.

3. The method of claim 1, further comprising:
   transmitting, using the transmit module, at least a portion of the frame not including the signal field in a guard band between legacy channels.

4. The method of claim 1, further comprising:
   identifying a number of reserve bits included in the signal field; and
   selecting, using a baseband processing module, the coding format for the signal field based on the number of reserve bits.

5. The method of claim 1, further comprising:
   configuring, using a baseband processing module, the signal field to include a rate/mode subfield.

6. The method of claim 5, further comprising:
   configuring, using the baseband processing module, the rate/mode subfield to include data indicating the channel width.

7. The method of claim 1, further comprising:
   configuring the frame in response to determining that a legacy wireless communication device is within a proximal region of the wireless communication device.

8. A wireless device for use in a communication network including both legacy and non-legacy wireless communication devices, the wireless device comprising:
   a processing module configured to:
      determine that a legacy wireless communication device is within a proximal region of the wireless communication device;
      in response to the determining, configuring a frame of a wireless communication signal to include:
         a legacy preamble;
         an initial signal field including data configured to allow the legacy wireless communication device to determine a duration of the frame;
         at least one additional signal field configured for use by non-legacy wireless communication devices; and
   a transceiver configured to transmit the frame.

9. The wireless device of claim 8, wherein the processing module is further configured to:
   identify a number of reserve bits in the initial signal field;
   determine a coding format according to the number of reserve bits; and
   select a coding format for the signal field based on the number of reserve bits.

10. The wireless device of claim 8, wherein:
   the processing module is further configured to insert a legacy packet header into the legacy preamble of the frame; and
   the transceiver is further configured to transmit the legacy preamble of the frame within a header spectral portion of a legacy channel.

11. The device of claim 8, wherein the wireless transceiver is further configured to:
   transmit a portion of the frame that includes the initial signal field within a legacy channel; and
   transmit at least a portion of the frame not including the initial signal field within a guard band between legacy channels.

12. The wireless device of claim 8, wherein the processing module is further configured to:
   include, in the initial signal field, a rate/mode sub-field, a length sub-field, at least one data unit sub-field, and a reserved sub-field.

13. The wireless device of claim 8, wherein the at least one additional signal field is configured to provide non-legacy devices an indication of channel usage.

14. The wireless device of claim 13, wherein the at least one additional signal field is configured to include data indicating a number of transmit antennas.

15. A wireless device for use in a network including both legacy and non-legacy wireless communication devices, the wireless device comprising:
   a transceiver configured to transmit wireless communication signals over multiple different communication channels;
   a processing module configured to generate a frame of a wireless communication signal configured to be at least partially processed by the legacy and non-legacy wireless communication devices, the frame including:
      a legacy-compatible preamble;
      a signal field configured to be processed by at least some of the legacy wireless communication devices, the signal field including:

first data indicating a duration of time during which the at least some of the legacy wireless communication devices are to refrain from attempting to access a communication channel; and second data indicating channel configuration information usable by non-legacy devices.

16. The wireless device of claim 15, the processing module further configured to:

determine a coding format according to the signal field;

arrange at least one bit in the signal field to comply with a channel width; and generate a coded signal field according to the coding format and the at least one bit in said signal field.

17. The wireless device of claim 16, the processing module further configured to:

identify a number of reserve bits included in the signal field; and determine the coding format based on the number of reserve bits.

18. The wireless device of claim 15, the processing module further configured to:

configure the signal field to include a rate/mode subfield.

19. The wireless device of claim 18, the processing module further configured to:

configuring the rate/mode subfield to include data indicating a channel width.

20. The device of claim 15, the wireless transceiver configured to:

transmit a portion of the frame that includes the initial signal field within a legacy channel; and transmit a portion of the frame not including the initial signal field within a guard band between legacy channels.

21. The wireless device of claim 15, wherein:

the processing module is further configured to insert a legacy packet header into the legacy preamble of the frame; and the transceiver is further configured to transmit the legacy preamble of the frame within a header spectral portion of a legacy channel.

* * * * *